United States Patent Office 3,331,190
Patented July 18, 1967

---

3,331,190
REMOVAL OF ACETYLENES FROM GASEOUS STREAMS WITH SILVER ZEOLITES
David N. Glew and Harold W. Quinn, Sarnia, Ontario, Canada, assignors to The Dow Chemical Company, Midland, Mich., a corporation of Delaware
No Drawing. Filed June 29, 1964, Ser. No. 378,975
5 Claims. (Cl. 55—63)

This invention relates to the removal of acetylenes from gaseous streams by selective adsorption with a silver zeolite. More particularly it relates to a new process for the removal of acetylene and monoalkylacetylenes containing up to 4 carbon atoms from gaseous mixtures having up to about 5000 p.p.m. of these acetylenes by contacting the mixtures with a crystalline zeolite having at least 10% of the exchangeable cations thereof as silver ions.

Acetylene is often an undesirable contaminant in gaseous process streams. For example, the presence of acetylene in the inlet air stream presents one of the most serious hazards in the manufacture of oxygen, nitrogen, and other products by the fractional distillation of liquid air. At normal process temperature, acetylene freezes to a solid, immiscible with other constituents. Consequently the solid acetylene accumulates in the process equipment and presents a severe explosive hazard. For large liquid air plants, the acetylene content should be limited to less than 1 part per million (p.p.m.), and preferably to less than 0.1 p.p.m. In the feed stream for ethylene polymerization, the presence of acetylenic hydrocarbons is detrimental not only as an explosive hazard, but also because the acetylenic hydrocarbons poison many of the catalysts normally used thereby causing shorter catalyst life and lower product yields.

Acetylenes are produced in small amounts as byproducts of conventional petroleum refinery operations. Often waste hydrocarbon may be present in the atmosphere in quantities sufficient to give an acetylene content of from 5-10 p.p.m. or more. Removal of acetylenes present in these trace quantities is not easily accomplished by distillation. Thus feed streams for liquid air plants are often purified by contact with a catalyst to oxidize the acetylene followed by further treatment to remove the oxidization products. Alternately acetylene can be removed by selective adsorption using solid, high surface area adsorbents such as silica gel, activated alumina, activated carbon, and more recently zeolite Molecular Sieves.

The present invention resides in the discovery that replacement of at least 10% of the cations of a crystalline zeolite with silver ions results in a material having enhanced capacity and efficiency for the adsorption of acetylene from gaseous process streams at temperatures ranging from about 0° to 120° C. It has been further discovered that the silver ion form of zeolite Molecular Sieve Type X has unusual capacity for adsorption of acetylene in the presence of olefinic hydrocarbons such as ethylene, and thus is highly effective for essentially complete removal of small quantities of acetylene from large volumes of a gaseous olefinic process stream. The adsorbed acetylene is strongly held and is not readily removed by an inert gas purge. However, the zeolite adsorbents are easily regenerated by oxidation of the adsorbed acetylene with oxygen at a temperature of from 150° to 400° C. thus permitting continued reuse.

The scientific literature contains numerous references to the adsorption properties of various crystalline natural and synthetic zeolites. In terms of the constituent oxides, these crystalline zeolites have the general composition:

$$wM_{2/n}O:Al_2O_3:xSiO_2:yH_2O$$

wherein M is a cation, n is the valence of the cation, and w, x, and y are numbers characteristic of specific zeolites. Basically these crystalline zeolites consist of a 3-dimensional aluminosilicate lattice of $SiO_4$ and $AlO_4^-$ tetrahedra cross-linked by shared oxygen atoms. The electrovalence of the aluminum is balanced by the inclusion of a cation (M) which is usually sodium. In dehydrated form, these crystalline zeolites have a relatively open structure with crystal cavities interconnected by extremely uniform pores. While the pore diameter of various crystalline zeolites may range from 3 to 15 or more angstroms, the pores for given crystal form, are substantially uniform in size. Because of this unique uniformity in crystal structure, these zeolites are highly useful as very specific adsorbents. They act as "molecular sieves" which can adsorb small molecules within the crystal lattice, but completely exclude molecules with a critical size larger than the effective pore diameter of the zeolite.

It is also known that both natural and synthetic zeolites can undergo cation exchange reactions. While zeolites normally occur or are most conveniently prepared in the sodium form, i.e., as a sodium zeolite, a major proportion of the sodium cations can be replaced with other cations, and particularly by mono- and divalent cations of hydrogen, lithium, potassium, silver, calcium, barium, etc., by conventional ion exchange techniques. The effective pore diameter and hence the selectivity of the zeolite adsorbent is determined in part by the cation and its position in the crystalline zeolite structure.

The invention described herein is broadly applicable to crystalline zeolites wherein at least 10 mole percent of the exchangeable cations are replaced by silver ions to give a silver zeolite, although substantially complete replacement of the exchangeable cations by silver ions is desirable for maximum efficiency and capacity. As used herein, the term "silver zeolite" refers to a zeolite wherein the silver is in the ionic form ($Ag^+$).

Particularly suitable in the process described herein are synthetic zeolites commercially available as Linde Molecular Sieves. More particularly, the preferred zeolites are Linde Molecular Sieve Types A, X, and Y, and faujasite, a natural equivalent of synthetic zeolite Type X. The synthesis and detailed characterization of these zeolites is given by Milton in U.S. Patents 2,882,243 and 2,882,244 for Types A and X respectively, and by Breck in U.S. Patent 3,130,007 for Type Y.

In brief these zeolites are characterized by the general formula:

Type A  $1.0 \pm 0.2M_{2/n}O:Al_2O_3:1.85 \pm 0.5SiO_2:yH_2O$
Type X  $0.9 \pm 0.2M_{2/n}O:Al_2O_3:2.5 \pm 0.5SiO_2:yH_2O$
Type Y  $0.9 \pm 0.2Na_2O:Al_2O_3:3.0 - 6.0SiO_2:yH_2O$ wherein y ranges up to about 9 depending on M and the degree of crystal hydration. Linde Molecular Sieve Type A has a theoretical pore diameter of 4.2 angstroms (A.) with an effective diameter of from 3–5 A. depending on the cation and its position within the crystal lattice. The sodium Type X zeolite admits molecules with critical diameters as large as 9 A., while in calcium form Type X has an effective pore diameter of about 8 angstroms. In general the Type Y zeolite has a pore size similar to that of Type X. In total ion exchange capacity zeolite Type Y has a somewhat lower capacity than zeolite Type X, which in turn has a lower exchange capacity than does zeolite Type A.

In the process described herein, a silver zeolite is employed to remove small amounts of acetylene, methylacetylene or ethylacetylene from a gaseous mixture with air, carbon monoxide, carbon dioxide, nitrogen, $C_1$–$C_6$ paraffinic and olefinic hydrocarbons, and other substantially neutral gases such as helium, neon and argon. While the process is applicable to streams containing as much as 0.5 wt. percent (5000 p.p.m.) of these acetylenes, it is more advantageously employed with gaseous mixtures containing up to about 300–500 p.p.m. acetylene. It is particularly useful in treating large volumes of rapidly flowing gas to reduce the acetylene concentration from 5–25 p.p.m. to less than 1 p.p.m.

The efficiency and capacity of the silver zeolite adsorbent is influenced by the silver ion content of the zeolite, by the composition of the gas stream, and by the crystal structure of the zeolite as well as by such operating factors as the temperature, bed volume and flow rate. For example, extraction studies using the sodium form of Linde Molecular Sieve Types A and X with varying amounts of the sodium replaced by silver cations, established that:

(1) For removal of acetylene from olefin streams, a substantially completely exchanged Type X zeolite containing 35.4 wt. percent silver had the highest capacity and efficiency reducing the acetylene content of an ethylene stream containing 5–25 p.p.m. of acetylene to less than 0.2 p.p.m.; a partially exchanged silver Type X zeolite had a similar efficiency, but an appreciably lower capacity; a silver Type A zeolite removed the acetylene to a residual concentration of about 0.7–1.0 p.p.m.; and the sodium zeolites were relatively ineffective;

(2) For extraction of acetylene from non-olefinic streams, the fully exchanged silver Type X zeolite had the greatest capacity, but the partially exchanged silver Type X and the silver Type A zeolites also have an appreciably greater acetylene capacity than the corresponding sodium forms; and (3) With increasing temperature in the range from about 25 to 100° C., the fully exchanged silver Type X zeolite retains its extraction efficiency to a greater degree than the partially exchanged silver Type X zeolite and the silver Type A zeolites.

Overall, the fully-exchanged silver Linde Molecular Sieve Type X has the greatest capacity for acetylene adsorption and is effective for complete removal of small quantities of acetylenes from large volumes of a fast-flowing olefinic, paraffinic or inert gas stream. In the absence of other unsaturated species competing with acetylene for adsorption at the silver ion sites, the silver Type A zeolite also offers a significantly enhanced capacity for acetylene adsorption. The behavior of the silver Type Y zeolite is in general intermediate between that of silver Type X and silver Type A.

The markedly greater capacity at higher temperatures for adsorption by the silver zeolites compared with the corresponding sodium zeolite is evidence for a strong interaction of acetylene with the silver ions within the crystal structure. Yet the adsorption is also profoundly influenced by the crystal structure in a manner not related to the normal molecular sieve action. This is clearly shown with the acetylene-ethylene mixture. Acetylene is strongly adsorbed by the silver Type X zeolite in the presence of ethylene. However, with the silver Type A zeolite, the selectivity for acetylene is insufficient to overcome the much higher ethylene concentration.

In practice the silver zeolites are readily prepared from natural or synthetic zeolites by conventional ion exchange techniques using for example aqueous silver nitrate. For fixed bed column operation it is convenient to employ the zeolite in pelleted or bead form. The process is generally employed within the temperature range from 0° to 120° C. using flow rates of from about 5–500 or more bed volumes per minute. Optimum operating conditions will depend, of course, on the initial and desired final acetylene concentration. If a final acetylene concentration in excess of 1 p.p.m. is acceptable, higher flow rates or smaller bed volumes can be employed than when the maximum desired concentration is 1 p.p.m. Normally the process is operated at atmospheric pressure, however moderate reduced or superatmospheric pressures ranging from about 0.1 to 50 atmospheres or more may be used provided the feed stream remains gaseous. Fluid bed techniques also can be used.

Generally the acetylene-containing gas stream is passed in contact with the silver zeolite until the acetylene capacity of the zeolite is nearly or completely exhausted as shown by an increase in the exit acetylene concentration above a desired level. At this point or earlier if desired, the feed stream can be discontinued or diverted to another unit and the silver zeolite regenerated. Since the adsorbed acetylene is strongly held, particularly by the silver Type X zeolite, regeneration is most easily achieved by oxidizing the adsorbed acetylene with air or oxygen at a temperature of 150° to 400° C. or more using sufficient oxygen for the reaction:

$$C_2H_2 + 2.5O_2 \rightarrow 2CO_2 + H_2O$$

With some silver zeolites, regeneration by flushing with a gas purge at an elevated temperature of 120–150° C. can be achieved. The regenerated silver zeolite can be repeatedly used.

In summary, this invention concerns an improved process for the removal of small quantities of acetylenes from gaseous streams through the use of a silver zeolite adsorbent. The silver zeolite adsorbents are highly permeable, physically strong, and chemically and thermally stable. The silver zeolite-acetylene system is insensitive to shock over a wide temperature range. The process can be used at high feed rates and is readily adapted to commercial practice. Selection of the preferred adsorbent and optimum operating conditions within the scope of this invention can be readily achieved in a few preliminary tests.

So that those skilled in the art may better understand how the present invention can be carried out and the advantages obtained therefrom, the following examples are given by way of illustration. Unless otherwise stated, all parts and percentages are by weight.

*Example 1.—Preparation of silver zeolites*

A. 100 parts of 30–60 mesh Linde Molecular Sieve Type 13X, a sodium zeolite, was treated in a column with excess 0.5 N silver nitrate solution. The resulting silver zeolite was washed thoroughly with distilled water and then dried at 450° C. for 48 hours. By analysis for silver ion, the zeolite contained 35.4 wt. percent silver, indicating substantially complete exchange of the replaceable sodium cations.

In a similar manner an essentially completely exchanged silver Type A zeolite was prepared from Linde Molecular Sieve Type 4A. The dried silver Type A zeolite contained 43.7 wt. percent silver. A similar silver Type Y zeolite contains about 28.0 wt. percent silver.

B. To prepare partially exchanged silver zeolites, a known quantity of a sodium zeolite was added to a dilute silver nitrate solution containing insufficient silver nitrate for complete exchange and stirred until equilibrium was reached. Then the partially exchanged silver zeolite was recovered, washed and dried. A typical partially exchanged silver zeolite prepared from Linde Molecular Sieve Type 13X contained 14.9 wt. percent silver.

*Example 2.—Removal of acetylene from helium*

To test the efficiency of the silver zeolite adsorbents, a stream of helium containing 0.23 percent by volume (2300 p.p.m.) of acetylene was passed at a rate of 75 ml./min. through a 3 ml. sample of the zeolite adsorbent held in a 6 mm. tube with a bed depth of about 11 cm. The exit gas stream was analyzed for acetylene by a gas chromatographic method sensitive to 0.2 p.p.m. acetylene. The test was continued until acetylene was found in the exit stream at a concentration greater than 1 p.p.m. The amount of adsorbed acetylene was then calculated as ml. of acetylene adsorbed per g. of zeolite in the initial sodium form. After each run, the adsorbent was regenerated by flushing with air at 250–400° C. for about an hour.

Typical results from runs made at several temperatures with a number of zeolite adsorbents are given in Table 1. The silver zeolites were prepared as described in Example 1. At 25° C., the silver Type X zeolite containing 35.4 wt. percent Ag adsorbed about 0.3 mole of acetylene/mole $Ag^+$. While the capacity is not quite as high at higher temperatures, note that there is a large increase in the ratio of acetylene adsorbed by the silver zeolite to that adsorbed by the sodium zeolite as the temperature increases. Likewise the acetylene capacity of Type A zeolite is enhanced particularly at higher temperatures by conversion to the silver form. The same is true for Type Y zeolite.

TABLE 1.—REMOVAL OF ACETYLENE FROM HELIUM

| Example | Zeolite | Wt. Percent Ag | Ml. $C_2H_2$ adsorbed/g. zeolite, $Na^+$ form | | |
|---|---|---|---|---|---|
| | | | 25° C. | 64° C. | 100° C. |
| 2-1 | Sodium Type X | 0 | 25.3 | 10.4 | 2.7 |
| 2-2 | Silver Type X | 14.9 | 19.6 | 14.4 | 9.8 |
| 2-3 | do | 35.4 | 38.8 | 27.7 | 29.0 |
| 2-4 | Sodium Type A | 0 | 4.9 | 1.0 | Nil |
| 2-5 | Silver Type A | 43.7 | 19.8 | 10.5 | 1.6 |

TABLE 2.—REMOVAL OF ACETYLENE FROM ETHYLENE AT 65° C.

| Example | Zeolite | Wt. Percent Ag | Acetylene Removal | | | |
|---|---|---|---|---|---|---|
| | | | Feed Conc., p.p.m. | Vol. Treated, l. | Final Conc.,ᵃ p.p.m. | $C_2H_2$ Removed,ᵇ ml./g. |
| 3-1 | Sodium Type X | 0 | 8.4 | 2 | 4.7 | <0.01 |
| 3-2 | Silver Type X | 14.9 | 6.5 | 68 | 0.2 | 0.68 |
| 3-3 | do | 35.4 | 6.0 | 320 | <0.2 | 3.20 |
| 3-4 | Sodium Type A | 0 | 8.4 | 2 | 7.8 | <0.01 |
| 3-5 | Silver Type A | 43.7 | 8.4 | 2 | 0.7 | 0.03 |

ᵃ Exit concentration after treating indicated volume of ethylene stream.
ᵇ Ml. $C_2H_2$ adsorbed/g. Zeolite, $Na^+$ form.

*Example 3.—Removal of acetylene from ethylene*

To test the efficiency of zeolite adsorbents for removal of small quantities of acetylene from ethylene, an ethylene stream containing 6–9 p.p.m. of acetylene was passed through a 1.0 ml. (0.60–0.65 g. $Na^+$ form) sample of adsorbent held in a 6 mm. tube with a bed depth of about 3.5 cm. at a rate of 300 ml./min. The exit gas stream was analyzed for acetylene as described in Example 2 and the initial break through volume recorded when the exit concentration of acetylene exceeded 0.2 p.p.m. After each run, the zeolite adsorbent was regenerated by flushing with air or oxygen at 100 ml./min. for 1 hour at 300–400° C.

Typical results at 65° C. using the silver zeolites described in Example 1 are given in Table 2. Under these test conditions acetylene removal to less than 0.2 p.p.m. was achieved only with the silver Type X zeolite. With the silver Type A zeolite under these conditions, the minimum exit concentration was about 0.7 p.p.m. acetylene. Note also that the acetylene capacity of the silver Type X zeolite containing 35.4 wt. percent Ag was not exceeded even after passage of 320 liters of gas, i.e., $3 \times 10^5$ bed volumes.

*Example 4.—Removal of monoalkylacetylenes*

A stream of helium containing 10 p.p.m. of methylacetylene was passed at 300 ml./min. through a bed of 0.84 g. Linde Molecular Sieve Type X containing 35.4 $Ag^+$ held in a column with a bed depth of about 3.5 cm. The exit gas was monitored for methylacetylene with an instrument sensitive to 0.2 p.p.m. methylacetylene. In a run made at 65° C., no methylacetylene was detectable in the exit stream even after the passage through the column of 200 l., about $2 \times 10^5$ bed volumes, of the helium mixture.

Small quantities of ethylacetylene are also efficiently removed in a similar manner by contact with a silver zeolite adsorbent.

We claim:
1. A process for removing an alkyne of the formula: $RC \equiv CH$ wherein R is H, $CH_3$ or $C_2H_5$ from a gaseous mixture consisting essentially of at least one $C_2$–$C_6$ olefinic hydrocarbon and up to 5,000 p.p.m. of said alkyne which comprises:
   (A) Contacting said gaseous mixture with a crystalline zeolite X wherein at least about 35 mole percent of the exchangeable zeolite cations are silver cations at a temperature of about 0°–120° C., and
   (B) Recovering therefrom a gaseous olefin with a lower content of said alkyne.
2. The process of claim 1 wherein the exchangeable cations of the zeolite molecular sieve are substantially completely replaced by silver cations.
3. The process of claim 1 wherein the gaseous mixture comprises up to 500 p.p.m. of acetylene in ethylene.
4. The process of claim 1 wherein the gaseous mixture consists essentially of up to 25 p.p.m. of acetylene in ethylene and the recovered ethylene contains less than 1 p.p.m. acetylene.
5. The process of claim 1 wherein the recovered gaseous olefin contains less than 1 p.p.m. of said alkyne.

References Cited

UNITED STATES PATENTS

| | | | |
|---|---|---|---|
| 3,078,636 | 2/1963 | Milton | 55—63 |
| 3,130,243 | 4/1964 | Dunn et al. | 260—677 |
| 3,200,082 | 8/1965 | Breck et al. | 55—75 |
| 3,207,803 | 9/1965 | Davis | 260—677 |

SAMIH N. ZAHARNA, *Primary Examiner.*

REUBEN FRIEDMAN, C. HART, *Assistant Examiners.*